United States Patent [19]

Amon et al.

[11] Patent Number: 5,199,981
[45] Date of Patent: Apr. 6, 1993

[54] PIGMENT COMPOSITIONS INCLUDING INTAGLIO PRINTING INK WASTE

[75] Inventors: Maurice A. Amon, New York, N.Y.; Ovart NitidandhaPrabhas, Bangkok, Thailand

[73] Assignee: Sicpa Holding SA, Switzerland

[21] Appl. No.: 643,556

[22] Filed: Jan. 18, 1991

[51] Int. Cl.⁵ ............................................. C09D 11/02
[52] U.S. Cl. ..................... 106/407; 106/499; 106/20 C; 106/400; 106/401
[58] Field of Search ............... 106/407, 23, 20, 400, 106/401

[56] References Cited

U.S. PATENT DOCUMENTS

| | | | |
|---|---|---|---|
| 3,989,278 | 11/1976 | Torok et al. | 106/20 |
| 4,251,441 | 2/1981 | Frölich et al. | 106/23 |
| 4,434,007 | 2/1984 | Lenox et al. | 106/23 |
| 4,664,711 | 5/1987 | Kawaguchi et al. | 106/23 |
| 4,720,304 | 1/1988 | Ruff et al. | 106/23 |
| 4,738,785 | 4/1988 | Langston et al. | 210/738 |
| 4,981,489 | 1/1991 | Ruff et al. | 106/23 |

FOREIGN PATENT DOCUMENTS

| | | | |
|---|---|---|---|
| 58-79508 | 5/1981 | Japan | 106/407 |
| 58-81409 | 10/1981 | Japan | 106/407 |
| 58-81410 | 10/1981 | Japan | 106/407 |
| 58-81484 | 10/1981 | Japan | 106/407 |
| 58-81412 | 12/1981 | Japan | 106/407 |
| 321675 | 11/1929 | United Kingdom | 106/407 |

Primary Examiner—Mark L. Bell
Assistant Examiner—Scott Hertzog
Attorney, Agent, or Firm—Ostrolenk, Faber, Gerb & Soffen

[57] ABSTRACT

A pigment composition is disclosed, obtained from intaglio or engraved steel die printing ink wastes. The wastes containing pigment, ink resins, extenders, and other minor components, are dried, ground and sieved to give a dry pigment composition. This pigment composition is optionally blended with plasticizers to give a pasty composition.

These compositions are useful to color and plasticize synthetic plastics materials such as sheetings, PVC leather and films.

22 Claims, No Drawings

PIGMENT COMPOSITIONS INCLUDING INTAGLIO PRINTING INK WASTE

BACKGROUND OF THE INVENTION

This invention relates to pigment compositions for the coloration of plastics materials, said compositions being obtained by recycling the intaglio sludge. It relates further to the use of such pigment compositions for pigmenting PVC sheets and synthetic leathers and commodity and recyclable plastics, and related industries.

In the intaglio printing process, especially in the engraved steel die printing, the lines or points to be printed are etched or engraved in the surface of the printing plate or cylinder. To obtain prints, ink is applied to the face of the printing plate until all the depressions are filled, any excess ink then being wiped off. Sheets or webs of paper are passed onto the printing plate, and through the pressure of the impression cylinder, the paper is to some extent pushed into the intaglio depressions whereby the ink is transferred from the plate to the paper and thus printing is effected. The intaglio printing process is able to produce thick prints of delicate fine-lined patterns and is therefore ideal for printing banknotes and valued security paper such as traveller's cheques and high denomination postage stamps.

The excess ink wiped off during the intaglio printing usually comes down in a wiping vat in the form of colloidal suspensions in water or organic solvents such as trichloroethylene, depending on the printing ink used. In both cases, however, the suspension must be recovered as a waste sludge. It consists of residual pigments, residual ink resins, extenders such as titanium dioxide and calcium carbonate, and trace metal catalysts. All are ingredients of most plastics.

Intaglio sludges thus constitute solid waste pollutants. As practiced among security printers, they are disposed of in landfills. As the cost of landfilling is increasing, alternative methods are being sought.

It is obvious that the method of incineration as practiced in many industries is applicable to intaglio solid wastes. But incineration produces toxic gaseous pollutants which must be effectively trapped. This means added costly expenditure.

It is not difficult to see that intaglio sludges still possess good light and chemical fastnesses since they comprise good pigments requisite of quality security printing inks. In other words, good pigment properties remain unimpaired in the intaglio sludge. Thus, the sludge makes promising reclaimed pigments.

SUMMARY TO THE INVENTION

It is the first and major object of this invention to provide a dry pigment composition from the intaglio sludge for use in the polyvinyl chloride (PVC) sheet and synthetic leather industry, and other commodity and recyclable plastics such as polyethylene (PE) and polypropylene (PP), etc.

Another object of this invention is to provide a paste-like pigment composition, starting from intaglio sludge, for the simultaneous coloration and plastification of synthetic materials.

It is still another object of this invention to provide methods for preparing a pigment composition for the coloration of synthetic plastics such as polyvinyl chloride, polyethylene and polypropylene starting from intaglio sludges, thus giving a new valor to waste materials, said pigment composition being either a dry powder or a pasty mixture of said dry powder with a plasticizer.

And yet another object of the invention is to provide methods for the coloration and, alternatively, the simultaneous coloration and plasticizing of synthetic plastics materials.

These objects and still others are fulfilled and implemented by the new and useful dry pigment composition for the coloring of synthetic plastics materials of the invention, which composition comprises pigment containing dried, pulverized and sieved ink wastes from intaglio printing processes. All solid components of the composition generally have a particle size less than to 15 microns, preferably below 10 microns.

A composition for the simultaneous coloring and plasticizing of plastics, according to the invention, is a pasty dispersion of dried, pulverized and sieved ink wastes from intaglio printing processes in a plasticizer. This composition wherein the particle size is preferably 10 microns or less, is appropriate for incorporation into plastisols. The plasticizer is preferably a liquid such as dioctyl phthalate. The starting product for making these dry or pasty pigment compositions is an intaglio sludge which should first be precipitated with a solution of a precipitating agent such as alum or calcium chloride, and filtered to give a filtercake which is then dried, pulverized or ground, and sieved to the desired particle size. This powder so obtained can be blended or dispersed with a plasticizer to give the pasty pigment composition of this invention.

In order to color and plasticize polyolefin stock such as articles, sheetings or webs of polyethylene or polypropylene, the pasty composition of the invention is added to the polyolefin stock at any desired step of the method of manufacture of said articles. Furthermore, in order to obtain the right shade desired, fresh pigments of appropriate color may be added. Firstly, a masterbatch of all components of the plastics may be prepared including the pigment composition of the invention, and this masterbatch is then shaped into the desired article, e.g. by extrusion molding and other molding processes.

PVC sheet and synthetic leathers, in particular, are amenable to coloration by the intaglio sludge since pigments are employed in paste form. Before giving examples of this invention, it is therefore appropriate to discuss methods of vinyl sheet and leather production.

MANUFACTURE OF VINYL LEATHER

Vinyl leathers can be made by dry blending of color in predispersed form, by using Banbury mixer, or by the plastisol or casting method. However, the process most amenable to the intaglio sludge is the plastisol method.

One type of arrangement that is used to produce a vinyl leather from a plastisol is the following. The resin, plasticizers, stabilizers, and pigments are first mixed together to form a syrup consistency liquid which is cast into a film of desired thickness onto a moving sheet of paper. This film is given a rudimentary form by heating briefly in an oven, causing the plasticizer to dissolve partly in the resin to form a gelatinous film. A second coat can then be cast on the original film. This contains a blowing agent—a substance that decomposes with heat and produces small bubbles of gas in the plastic mass, making a spongy feel. A knitted cotton fabric can then be pressed into the expanded layer, and then the entire sandwich is cured, embossed and finally stripped from the paper and rolled up. A roll of synthetic PVC leather is obtained.

From what has been said, it is seen that the intaglio sludge is appropriate for making the plastisol paste pigment. Therefore, according to this invention, there is provided a most economical method of recycling pigments from the intaglio sludge for use in the PVC and other plastic industries.

EXAMPLES OF THE INVENTION

The invention will now be illustrated by the following examples which are not to be understood to limit the invention in any way.

EXAMPLE 1

Preparation of a dry reclaimed pigment composition

A.—A cylinder wiping solution/dispersion stemming from an engraved steel die intaglio printing machine was treated with alum as a precipitating agent. The thus treated mixture was filtered through a filter press. The solids precipitated from the starting liquor are recovered as a filter cake containing about 90% of solids.

B.—The moist cake was spread on trays and dried for about three days in open air at 30° to 40° C. Alternatively, the cake was dried in warm air at about 70° C. for several hours. The resulting mass was virtually moisture free.

C.—The dried mass of step B was then pulverized in a high speed impeller device until a fineness below about 15 microns. The powder was then passed through a sieving device having sieve openings of 10 microns.

A dark powder was obtained, composed of original pigment, residual ink resins, extenders such as calcium carbonate, titanium dioxide, alumina and, occasionally, metal catalyst traces.

The powder is ready for use as a pigment composition for the plastics and related industries.

Since the dry sludge is a combination of wastes from intaglio inks of different printings, the dried, powdered pigments are dark in color which differs from batch to batch, and also from printing works to printing works. However, a certain consistent shade can be obtained by mixing different batches in one lot and/or adding small amounts of virgin pigments, for example before pulverizing the dried cake or during the paste making to be described in Example 2.

Complete drying of the sludge or cake is very important for use in the sponge or foam layer of the PVC synthetic leather, since residual water in the sludge will cause local swelling, constituting a spoilage.

EXAMPLE 2

Pigment Pastes from Intaglio Sludges

The powdered, reclaimed pigment composition of example 1 was mixed with 35% (w/w) dioctyl phthalate (D.O.P.) and stirred for one hour. In place of D.O.P. other compatible plasticizers such as "Cereclor" (a chlorinated paraffin plasticizer supplied by ICI) can be used. Since complete mixing is time-consuming, it is appropriate to let the mixture stand at room temperature for about one day to bring about complete absorption of the plasticizer. The mixture was then ground in a three-roll mill until a paste was obtained where the solids have a fineness below about 10 microns. The paste was then used as a component of polyvinyl chloride (PVC) sheet and leather pigments, both top and foam layers, and also as pigments for polyethylene (P.E.) and polypropylene (P.P.).

The three-roll mill grinding serves to prevent coarser impurity particles than 10 microns from contaminating the product. This is very important as far as the quality of the product is concerned.

EXAMPLE 3

PVC Sheet Colored with the Intaglio Sludge

A gray PVC sheet of 0.25 mm thickness, colored with a dark green intaglio pigment paste made according to Example 2, was manufactured by the calendering process, using the following formulation.

| | |
|---|---|
| PVC (K value 67) | 500.0 Kg |
| D.O.P. | 195.0 Kg |
| Epoxy plasticizer | 10.0 Kg |
| Stabilizer (barium stearate) | 20.0 Kg |
| Lubricant (stearic acid) | 1.0 Kg |
| Calcium carbonate | 50.0 Kg |
| Green pigment paste | 7.7 Kg |
| Carbon black | 2.9 Kg |
| Chrome yellow | 0.6 Kg |
| Titanium dioxide | 7.7 Kg |

The yellow and black pigments were added to make the overall color gray.

As a matter of fact, a variation in color around the greenish shade can be made by adding small amounts of red, green, blue and yellow or combination thereof to the above formulation.

No change in color has been observed upon exposure of the sheet in the Fade-o-meter for 100 hours. Also, the physical properties of the sheet remain the same as those of PVC sheets colored with virgin pigments.

The resultant sheet was exposed outdoors to sunlight and humidity for six months. No change in color was observed.

The above formulation is successful in industrial production.

EXAMPLE 4

Foam Layer of the PVC Leather Colored with the Intaglio Sludge

A dark red sponge layer of the PVC synthetic leather was manufactured according to the following formulation, using the casting process.

| | |
|---|---|
| PVC (K value 66) | 157.0 Kg |
| D.O.P. | 80.0 Kg |
| Secondary plasticizer | 18.9 Kg |
| Kicker (barium zinc liquid complex) | 4.8 Kg |
| Blowing agent (azodicarbonamide) | 4.8 Kg |
| Calcium carbonate | 25.0 Kg |
| Green pigment paste of Example 3 | 2.0 Kg |
| Red pigment | 6.0 Kg |

The above formulation has been successful in industrial production.

EXAMPLE 5

Car Mat Colored with the Intaglio Sludge

A black car mat was manufactured from PVC according to the following formulation, using the calendering process.

| | |
|---|---|
| PVC (K value 66) | 500.0 Kg |

| -continued | |
|---|---|
| D.O.P. | 120.0 Kg |
| Epoxy plasticizer | 10.0 Kg |
| Stabilizer | 20.0 Kg |
| Lubricant (stearic acid) | 1.0 Kg |
| Calcium carbonate | 25.0 Kg |
| Green pigment paste of Example 3 | 1.4 Kg |
| Carbon black | 0.7 Kg |

The above formulation has been successful in industrial production.

EXAMPLE 6

P.E. Film Colored with the Intaglio Sludge 100.0 g of a P.E. commercial packaging film was mixed with 1.0 g of the green pigment paste of Example 3 and 0.25 g of tinting blue in a two-roll mill heated at 120° C. The light blue film of 0.03 mm thickness thus obtained showed good pigment dispersion.

EXAMPLE 7

Injection Molding of P.E. Colored with the Intaglio Sludge

A simulated P.E. masterbatch was made by first making P.E. sheets of maximum thickness attainable with the two-roll mill by the method of Example 6, using only the green pigment paste of Example 3 as the colorant. The sheet was cut into small pieces and fed as a masterbatch into a laboratory injection molding machine. The resultant molded object showed good dispersion of the pigment.

EXAMPLE 8

P.P. Film Colored with the Intaglio Sludge 100 g of commercial P.P. pellets were mixed with 1 g of the green pigment paste of Example 3 and 0.2 g of a lubricant in a two-roll mill heated at 160° C. A light green film of 0.5 mm thickness thus obtained showed good pigment dispersion.

As described before, according to the invention, the intaglio sludge obtained from the intaglio printing can be made into pigment pastes to color plastics. Therefore, the invention enables the production of plastics at a low pigment cost, thus providing low-priced plastics.

Also, as described earlier, although the intaglio sludge is used for the invention, the product will not emit any offensive odor, nor be decomposed since no incineration is made. There is no gaseous emission into the atmosphere.

Moreover, according to the invention, a variety of shades can be made around the original color of the paste pigment by adding small amounts of red, green, blue, or yellow pigments. Thus, the plastics manufacturer is provided with a wide range of colors.

Also, the dried, finely ground sludge, under appropriate conditions, can serve as a dyestuff or colorant for industries requiring pigments such as the rubber industry.

In addition, the invention is a most practical and economical way of recycling the intaglio sludge.

Most importantly, the invention provides a profitable way of getting rid of intaglio sludges. It substitutes for the method of landfilling which is not practical nowadays in view of the soaring price of the land everywhere in the world. The landfilling method also has an added disadvantage in that no plants can grow on the sludge-filled land.

The invention has been described above in general and by way of examples. It should be noticed that it is not limited in any way by that disclosure and that it may be varied by the man skilled in the art within the scope of the appended claims.

We claim:

1. A dry pigment composition for the coloration of synthetic plastic materials, comprising dried, pulverized and sieved ink wastes from intaglio printing processes, said ink wastes comprising pigment and residual ink resins.

2. The pigment composition of claim 1 wherein all solid components have a particle size less than 15 microns.

3. The pigment composition of claim 1 wherein said wastes contain pigment, residual ink resins, extenders, titanium dioxide, alumina and trace metal catalysts.

4. A pigment composition for the coloration and plastification of synthetic materials, comprising a pasty dispersion of dried, pulverized and sieved ink wastes from intaglio printing processes in a plasticizer, said ink wastes comprising pigment and residual ink resins.

5. The pigment composition of claim 4 wherein all solid components have a particle size less than to 10 microns.

6. The pigment composition of claim 4 wherein said wastes contain pigment, residual ink resins, extenders, titanium dioxide, alumina and trace metal catalysts.

7. The pigment composition of claim 4 wherein the plasticizer is a liquid at room temperature.

8. The pigment composition of claim 4 wherein the plasticizer is dioctyl phthalate.

9. A method for preparing a pigment composition for the coloration of synthetic plastic materials, comprising the steps of (A) providing intaglio printing sludge comprising pigment and residual ink resins, (B) drying the sludge, (C) grinding the dried sludge to the desired particle size, and (D) sieving the dried and ground sludge.

10. The method of claim 9, wherein the sludge is provided in step (A) as a cake formed by precipitating an intaglio waste liquid with a solution of a precipitating agent, filtering the precipitate, and supplying the filter residue to step (B).

11. The method of claim 9, further comprising the step of (E) dispersing the sieved dry and ground sludge in a plasticizer to obtain a pasty pigment composition.

12. The method of claim 9 wherein the intaglio printing sludges of step (A) contain pigment, residual ink resins, extenders, titanium dioxide, alumina and trace metal catalysts.

13. A process for coloring PVC sheetings prepared from a PVC plastisol, comprising adding the pigment paste of claim 4 to the plastisol for coloring and plasticizing the PVC sheetings.

14. The process of claim 13, further comprising adding fresh pigments to the plastisol for modifying the color shade.

15. A process for coloring shaped articles prepared from polyolefin stock, comprising adding the pigment composition of claim 4 to the polyolefin stock.

16. The process of claim 15, further comprising adding fresh pigments to said pigment composition or to said polyolefin stock.

17. The process of claim 15 wherein the articles are recyclable articles.

18. The process of claim 15 wherein said polyolefin is polyethylene.

19. The process of claim 15 wherein said polyolefin is polypropylene.

20. The process of claim 15 further comprising the steps of first forming a master-batch comprising polyolefin and pigment composition, said masterbatch being subsequently transformed into said shaped article by molding.

21. The process of claim 20, wherein said molding is injection molding.

22. The process of claim 13, wherein said PVC sheetings are PVC leather.

* * * * *